(12) United States Patent
Lai

(10) Patent No.: US 7,236,463 B2
(45) Date of Patent: Jun. 26, 2007

(54) TRANSCEIVER FOR ECHO AND NEAR-END CROSSTALK CANCELLATION WITHOUT LOOP TIMING CONFIGURATION

(75) Inventor: Jyh-Ting Lai, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 1035 days.

(21) Appl. No.: 10/389,966

(22) Filed: Mar. 18, 2003

(65) Prior Publication Data

US 2004/0052221 A1     Mar. 18, 2004

(30) Foreign Application Priority Data

Sep. 12, 2002    (TW) ............................... 91120858 A

(51) Int. Cl.
*H04M 9/08*    (2006.01)
*H04B 3/20*    (2006.01)

(52) U.S. Cl. ...................... 370/286; 370/287; 370/289; 379/406.01; 379/417

(58) Field of Classification Search ..................... None
See application file for complete search history.

(56) References Cited

U.S. PATENT DOCUMENTS 6,240,128 B1 *   5/2001   Banerjea et al. ............. 375/222

* cited by examiner

*Primary Examiner*—Ramnandan Singh
(74) *Attorney, Agent, or Firm*—Winston Hsu

(57) ABSTRACT

A transceiver for echo and near-end crosstalk cancellation without a loop timing configuration. The transceiver comprises a receiver, a timing recovery circuit, a same-channel phase interpolator, an echo canceller, a near-channel phase interpolator and a near-end crosstalk (NEXT) canceller. The same-channel phase interpolator and the near-channel phase interpolator receive a phase choosing signal from the timing recovery circuit to determine a specific phase from different phases. The same-channel phase interpolator generates a same-channel phase-modified signal with the specific phase and outputs the phase-modified signal to the echo canceller to cancel an echo in the received signal. The near-channel phase interpolator generates a near-channel phase-modified signal with the specific phase and outputs the near-channel phase-modified signal to the NEXT canceller to cancel a NEXT signal in the received signal.

14 Claims, 6 Drawing Sheets

TRANSCEIVER FOR ECHO AND NEAR-END CROSSTALK CANCELLATION WITHOUT LOOP TIMING CONFIGURATION

BACKGROUND OF THE INVENTION

1. Field of the Invention

This invention relates to digital data transmission systems. In particular, the present invention relates to a transceiver for echo and near-end crosstalk (NEXT) cancellation without a loop timing configuration and a method of the transceiver for echo and NEXT cancellation.

2. Description of the Related Art

Many communication applications, such as high speed data communication devices, require high insulation against noise, and must meet high precision requirements necessary for digital transmission/reception, e.g., a transceiver implemented in Gigabit Ethernet standard. In such applications, communications over an unshielded twister pair (UTP) or other communications loop may require a very low or even error free transmission of coded data. For example, a bit error rate (BER) equal to or less than $10^{-10}$ is required for use in the Gigabit Ethernet. Such bit error rates are difficult to obtain given unknown delays, attenuation, dispersion, noise, and inter-symbol interference (ISI) introduced by and/or on the communications channel. One area where BER must be closely controlled is at the transceiver adaptive echo canceller in duplex digital data transmission systems.

Furthermore, echo and near-end crosstalk are usually serious problems in digital data transmission systems. The schematic diagram in FIG. 1 illustrates near-end crosstalk and echo problems. The UTPs shown in FIG. 1 are twisted pairs 10 and 12 following category 5 standard. The twisted pairs 10 and 12 are transmission media. The Hybrid devices 10a, 10b, 12a, and 12b combine transmitted and received signals. The data are transmitted to channel through the hybrid devices 10a, 10b, 12a, and 12b. In the embodiment, the transmitting ends Tx1 and Tx2 and the receiving ends, Rx1 and Rx2 are at the local end. The transmitting end Tx and the receiving end Rx are at the remote end. When the signal is transmitted to the hybrid device 10a, a portion of the signal will be received by the local receiving end Rx1, and which is called "echo". If the receiving end Rx1 receives a signal from other channels in the local end, i.e. the signal is transmitted through the twisted pair 12, the signal received by the receiving end Rx1 is referred to as near-end crosstalk.

Conventional techniques for echo and near-end crosstalk cancellation generally use an adaptive canceller to estimate impulse responses of echo and near-end crosstalk and subtract them from the received signal. FIG. 2 is a schematic diagram illustrating the configuration of a typical transceiver comprising an echo canceller and a near-end crosstalk (NEXT) canceller. A hybrid device 208, connected to the channel (not shown in FIG. 2), combines transmitted data with received data and transmits the transmitted data to a channel. A transmitting end Tx1 and a receiving end Rx1 are at the same twisted pair of a local end. A transmitting end Tx2 is at another twisted pair of the local end. The digital-to-analog converter (DAC) 204 converts a digital signal to an analog signal. The transmitting end Tx1 transmits the analog signal from the hybrid device 208 to the channel. The receiving end Rx1 receives a signal from the channel through the hybrid deice 208. The received signal is transmitted to an analog-to-digital converter (ADC) 210. The ADC 210 digitizes the received signal and feeds a digital signal to an equalizer 212. A timing recovery circuit 214 receives an equalized signal from the equalizer 212 and recovers a clock from the equalized signal. The echo canceller 202 is coupled between the transmitting end Tx1 and the receiving end Rx1. The echo canceller 202 estimates impulse response of echo. Then, the echo is removed from an equalized signal by an adder 220. The NEXT canceller 216 is coupled between the transmitting end Tx2 and the receiving end Rx1. The NEXT canceller 216 estimates impulse response of near-end crosstalk. Then, the near-end crosstalk is removed from the equalized signal by an adder 220. Typically, the clock in the transmitting end Tx1 and Tx2 is produced by a local oscillator. The clock in the receiving end Rx1 is recovered by the received signal. Thus, the clock domain in the transmitting end is different from that in the receiving end. That will cause asynchronous problems in circuit design.

To solve the above problem, a loop timing system is provided. FIG. 3 is a schematic diagram illustrating the configuration of the typical loop timing system. The loop timing system is applied in a Gigabit Ethernet communication system. Four twisted pairs in the loop timing system transmit the data. In the loop timing system, a transmitting end Tx1m and a receiving end Rx1m are at the master end 302. A transmitting end Tx2s and a receiving end Rx2s are at the slave end 304. A clock of the transmitting end Tx1m is produced by a local oscillator of the master end 302. A clock in the transmitting end Tx2s is recovered by a signal received by the receiving end Rx2s. Thus, at the slave end 304, the clock in the transmitting end Tx2s is the same as the clock in the receiving end Rx2s. After the master end 302 receives a signal transmitted from the transmitting end Tx2s, the clock in the receiving end Rx1m is recovered by the signal. Then, at the master end 302, the clock in the transmitting end Tx1m is synchronized to the clock in the receiving end Rx1m. After overcoming the problem of different clocks between the transmitting end and the receiving end, echo and near-end crosstalk cancellation are accomplished completely. However, because the loop timing system is much more complex than other communication systems, the development cost of the system is high and such a complex design is not suitable in some digital data communication systems.

SUMMARY OF THE INVENTION

An object of the present invention is to provide a transceiver for echo and near-end crosstalk cancellation without the design of loop timing system, implemented to significantly decrease development and design costs.

Another object of the present invention is to provide a method of the transceiver for echo and near-end crosstalk cancellation, implemented to decrease bit error rate and increase transmission quality in high speed communication systems.

The transceiver for echo and near-end crosstalk cancellation of the present invention comprises a receiver, a timing recovery circuit, a same-channel phase interpolator, an echo canceller, a near-channel phase interpolator and a near-end crosstalk (NEXT) canceller. A signal transmitted from the communication channel is received by the receiver. The timing recovery circuit generates a phase choosing signal according to the received signal. A same-channel signal which will be transmitted from a same-channel transmitting end to the communication channel is feed into the same-channel phase interpolator to generate a plurality of signals with different phases. The phase choosing signal from the timing recovery circuit determines a specific phase from the different phases. The same-channel phase interpolator determines a same-channel phase-modified signal with the specific phase and outputs the same-channel phase-modified signal. The same-channel phase-modified signal is feed into the echo canceller to cancel an echo in the received signal. A near-channel signal which will be transmitted from a near-channel transmitting end to the communication channel is feed into the near-channel phase interpolator to generate a plurality of signals with a plurality of different phases. The phase choosing signal from the timing recovery circuit determines a specific phase from the different phases. The same-channel phase interpolator determines a near-channel phase-modified signal with the specific phase and outputs the near-channel phase-modified signal. The NEXT canceller receives the near-channel phase-modified signal to cancel a NEXT signal in the received signal.

Furthermore, the invention also provides a method of utilizing the transceiver for echo and NEXT cancellation in a digital data transmission system where a transceiver transmits a same-channel signal from a same-channel transmitting end to a communication channel and a near-channel signal from a near-channel transmitting end to the communication channel, and receives a signal from the communications channel. First, a phase choosing signal is determined according to the signal received by a receiver. Then, a same-channel phase-modified signal and a near-channel phase-modified signal with a specific phase determined by the phase choosing signal are generated. Finally, an echo of the received signal is canceled by feeding the same-channel phase-modified signal to an echo canceller and a NEXT signal in the received signal is canceled by feeding the near-channel phase-modified signal to a NEXT canceller.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
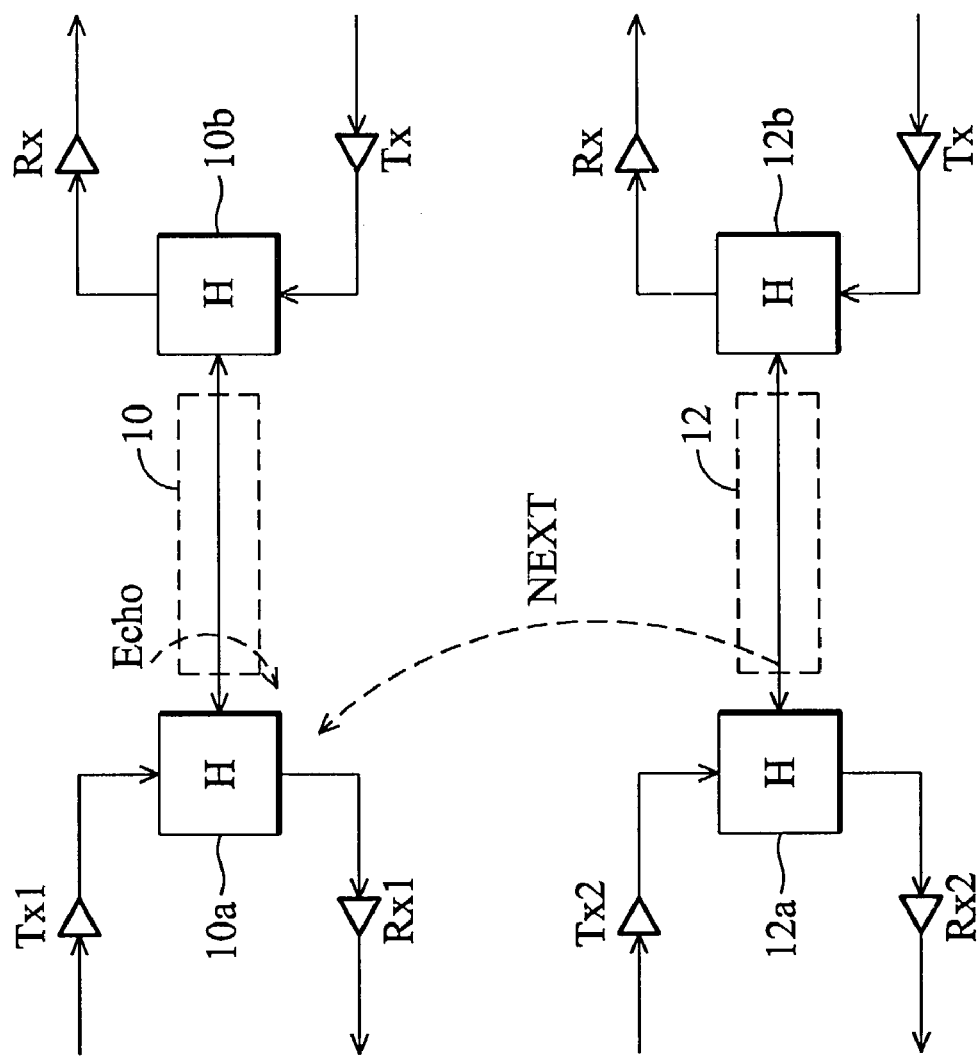
FIG. 1 is a schematic diagram illustrating near-end crosstalk (NEXT) and echo problems.
Figure 2:
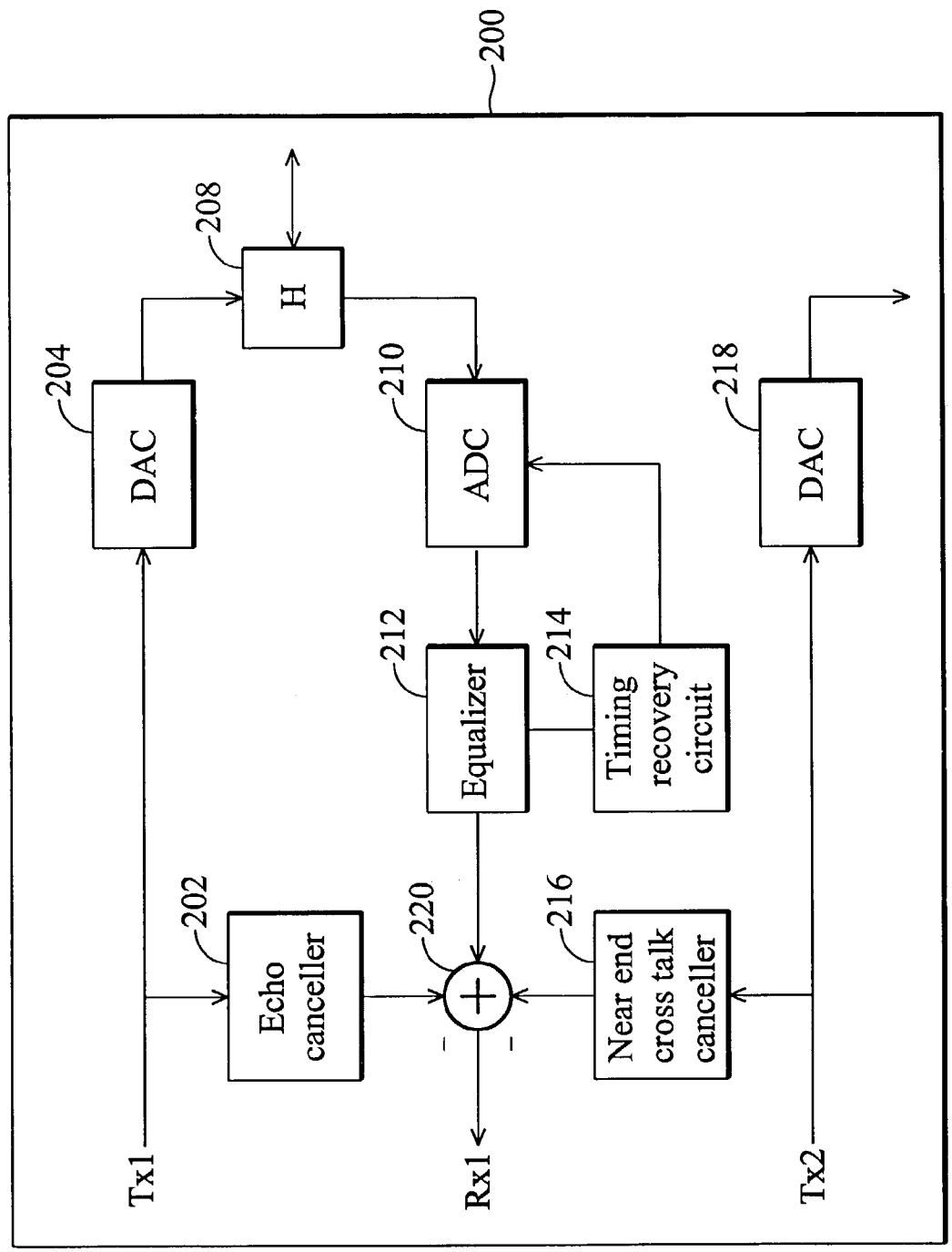
FIG. 2 is a schematic diagram illustrating the configuration of the typical transceiver comprising an echo canceller and a NEXT canceller.
Figure 3:
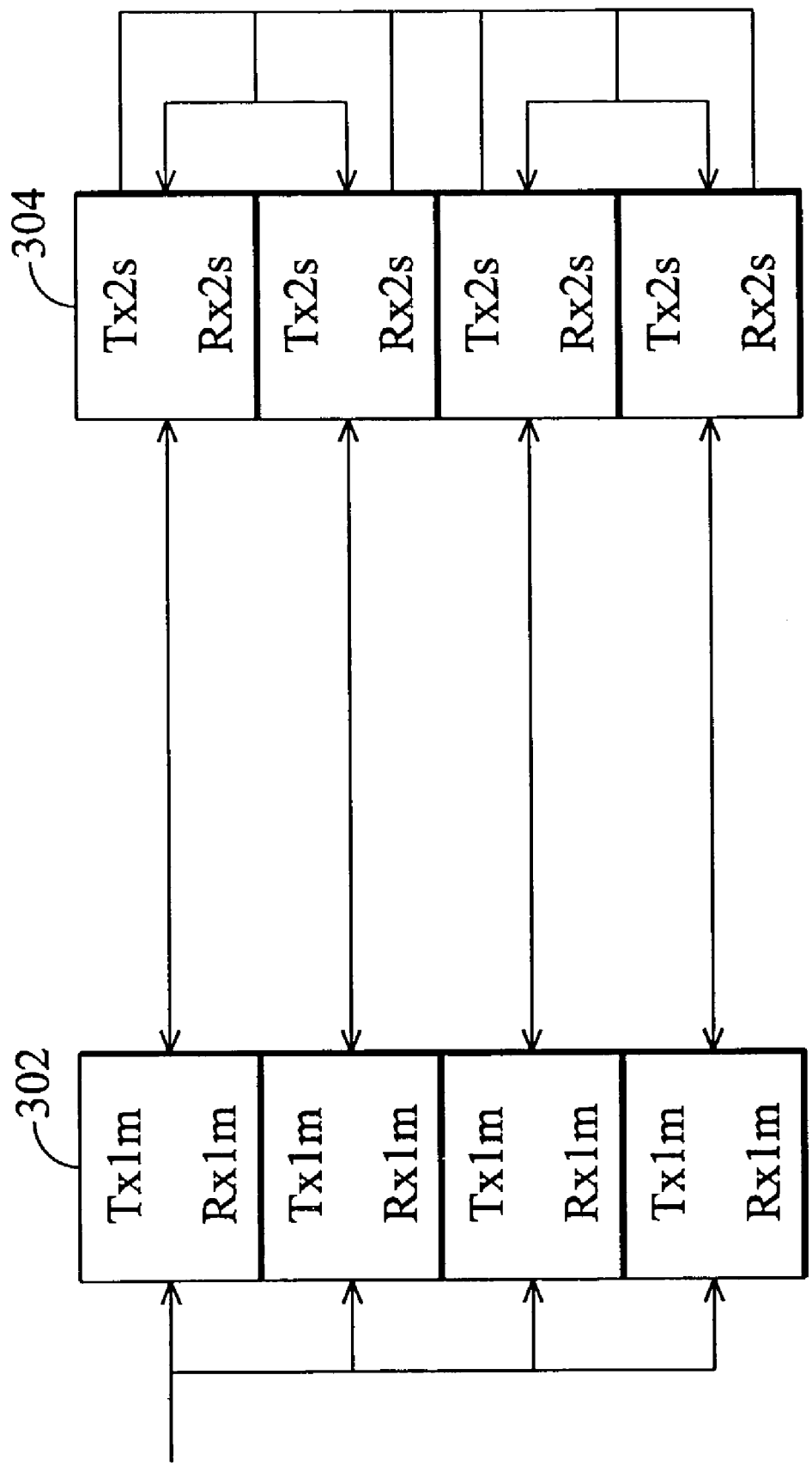
FIG. 3 is a schematic diagram illustrating the configuration of the typical loop timing system.
Figure 4:
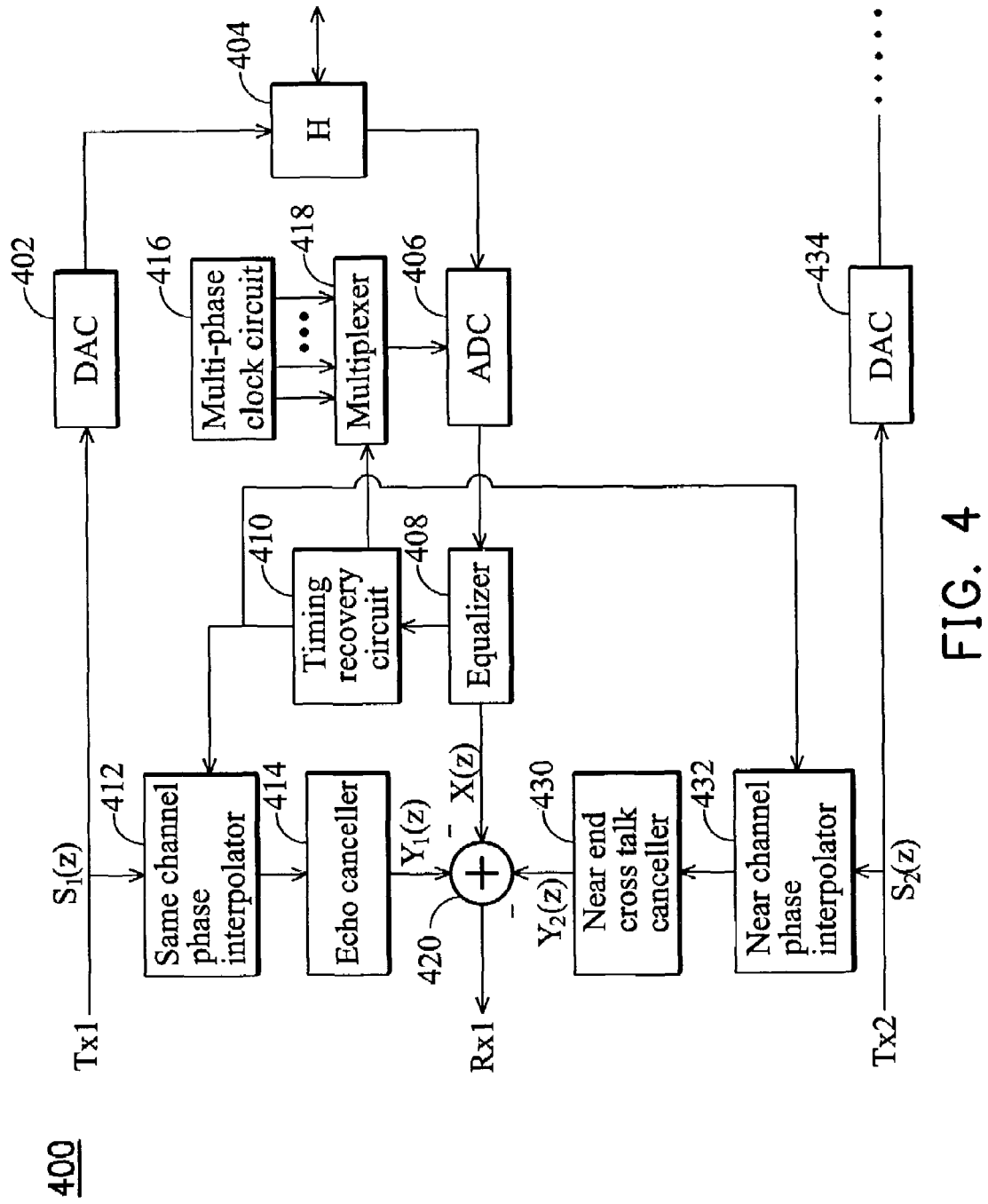
FIG. 4 is a schematic diagram illustrating the configuration of the transceiver according to the embodiment of the invention.

FIG. 4 is a schematic diagram illustrating the configuration of the transceiver according to the embodiment of the invention. In this embodiment, the transceiver with one receiving end and two transmitting ends is used as an example. Thus, the invention can be implemented in other transceivers with several receiving ends and transmitting ends such as Gigabit Ethernet with four twisted pairs or Fast Ethernet with two twisted pairs.

As shown in FIG. 4, a transmitting end Tx1 and a receiving end Rx1 are at the same twisted pair in the local end. The transmitting end Tx2 is at another twisted pair in the local end. The transceiver 400 comprises digital-to-analog converters (DAC) 402 and 434, a hybrid device 404, an analog-to-digital converter (ADC) 406, an equalizer 408, a timing recovery circuit 410, a same-channel phase interpolator 412, an echo canceller 414, a multi-phase clock circuit 416, a multiplexer 418, an adder 420, a near-channel phase interpolator 432 and a near-end crosstalk (NEXT) canceller 430. The transceiver 400 transmits data from the transmitting end Tx1 and Tx2 to a channel (not shown in FIG. 4) and receives data from the channel by the receiving end Rx1. The hybrid device 404 is connected to the channel. The hybrid device 404 combines transmitted data and received data and transmits the data to a channel. After the DAC 402, the transmitting end Tx1 transmits a signal $S_1(z)$ from the hybrid device 404 to the channel. At the same time, the transmitting end Tx1 also transmits the signal $S_1(z)$ to the same-channel phase interpolator 412. In addition, after the DAC 434, the transmitting end Tx2 transmits a signal $S_2(z)$ from a hybrid device (not shown in FIG. 4) to the channel. At the same time, the transmitting end Tx2 also transmits the signal $S_2(z)$ to the near-channel phase interpolator 432.

The receiving end Rx1 receives a signal from the channel through the hybrid deice 404. The received signal is transmitted to the ADC 406. The ADC 406 digitizes the received signal and transmits a digital signal to the equalizer 408. Typically, a signal transmitted through the channel is hampered by various sources of signal degradation. One such source is inter-symbol interference where consecutive transmitted symbols interfere with each other. Other sources of signal degradation further comprise the transmission media (i.e. wire) and analog filters. These factors produce large amplitude and group delay distortion in the signal that needs compensation. To compensate for inter-symbol interference (ISI) and other sources of signal degradation and distortion, best performance is achieved by implementing an equalizer. In the embodiment of the present invention, the equalizer 408 provides the function of equalization. The timing recovery circuit 410 receives an equalized signal from the equalizer 408. The Z transform of the equalized signal is $X(z)$. According to the equalized signal $X(z)$, the timing recovery circuit 410 produces a phase choosing signal to feed into the same-channel phase interpolator 412, the near-channel phase interpolator 432, and the multiplexer 418.

The multi-phase clock circuit 416 generates a plurality of clock signals with different phases. The multiplexer 418 receives the clock signals from the multi-phase clock circuit 416 and the phase choosing signal from the timing recovery circuit 410. The multiplexer 418 chooses one of the clock signals by the phase choosing signal to generate a new clock signal to feed to the ADC 406.

The same-channel phase interpolator 412 receives the signal $S_1(z)$ from the transmitting end Tx1 to generate a plurality of signals with a plurality of different phases. The same-channel phase interpolator 412 also receives the phase choosing signal from the timing recovery circuit 410 to determine a specific phase from the different phases. The same-channel phase interpolator 412 determines a same-channel phase-modified signal with the specific phase and outputs the same-channel phase-modified signal to the echo canceller 414. The echo canceller 414 receives the same-channel phase-modified signal and estimates a echo $Y_1(z)$ produced by the same-channel phase-modified signal. By the adder 420, the echo $Y_1(z)$ is subtracted from the equalized signal X(z) output from the equalizer 408. Thus, an echo in the equalized signal X(z) is canceled completely.

The near-channel phase interpolator 432 receives the signal $S_2(z)$ from the transmitting end Tx2 to generate a plurality of signals with a plurality of different phases. The near-channel phase interpolator 432 also receives the phase choosing signal from the timing recovery circuit 410 to determine a specific phase from the different phases. The near-channel phase interpolator 432 determines a near-channel phase-modified signal with the specific phase and outputs the near-channel phase-modified signal to the NEXT canceller 430. The NEXT canceller 430 receives the near-channel phase-modified signal and estimates a NEXT signal $Y_2(z)$ produced by the near-channel phase-modified signal. By the adder 420, the NEXT signal $Y_2(z)$ is subtracted from the equalized signal X(z) output from the equalizer 408. Thus, a NEXT signal in the equalized signal X(z) is canceled completely.

The following illustrates how the transceiver of the present invention implements echo and NEXT cancellation without the design of the loop timing system.

(1). echo cancellation $$X(z)=S_1(z)H(z)e^{j\Phi}$$

$$\Phi=2\Pi(T_t-T_k)/T$$

$$Y_1(z)=S_1(z)e^{j\Phi}W(z)$$

Thus, $Err(z)=X(z)-Y_1(z)=S_1(z)e^{j\Phi}(H(z)-W(z))$ where H(z) is the transform function of the channel, $T_t$ is the phase input to the DAC 402 i.e. the phase of the clock in the transmitting end Tx1, $T_k$ is the phase input to the ADC 406 i.e. the phase of the clock in the receiving end Rx1, T is the period of the clock in the transceiver, W(z) is the transform function of the echo canceller 414, and Err(x) is the error signal of the echo canceller 414.

When the echo canceller 414 are stable and not adjusted, the transform function of the channel H(z) is equal to the transform function of the echo canceller W(z). Then, the error signal of the echo canceller Err(z) becomes zero and the echo in the equalized signal X(z) is canceled completely.

(2). near-end crosstalk cancellation $$X(z)=S_2(z)H(z)e^{j\Phi}$$

$$\Phi=2\Pi(T_t-T_k)/T$$

$$Y_2(z)=S_2(z)e^{j\Phi}Q(z)$$

Thus, $Err(z)=X(z)-Y_2(z)=S_2(z)e^{j\Phi}(H(z)-Q(z))$ where H(z) is the transform function of the channel, $T_t$ is the phase input to the DAC 434 i.e. the phase of the clock in the transmitting end Tx2, $T_k$ is the phase input to the ADC 406 i.e. the phase of the clock in the receiving end Rx1, T is the period of the clock in the transceiver, Q(z) is the transform function of the NEXT canceller 430, and Err(x) is the NEXT signal.

When the NEXT canceller 430 is stable and not adjusted, the transform function of the channel H(z) is equal to the transform function of the NEXT canceller Q(z). Then, the NEXT signal Err(z) becomes zero and the NEXT signal in the equalized signal X(z) is canceled completely.

Figure 5:
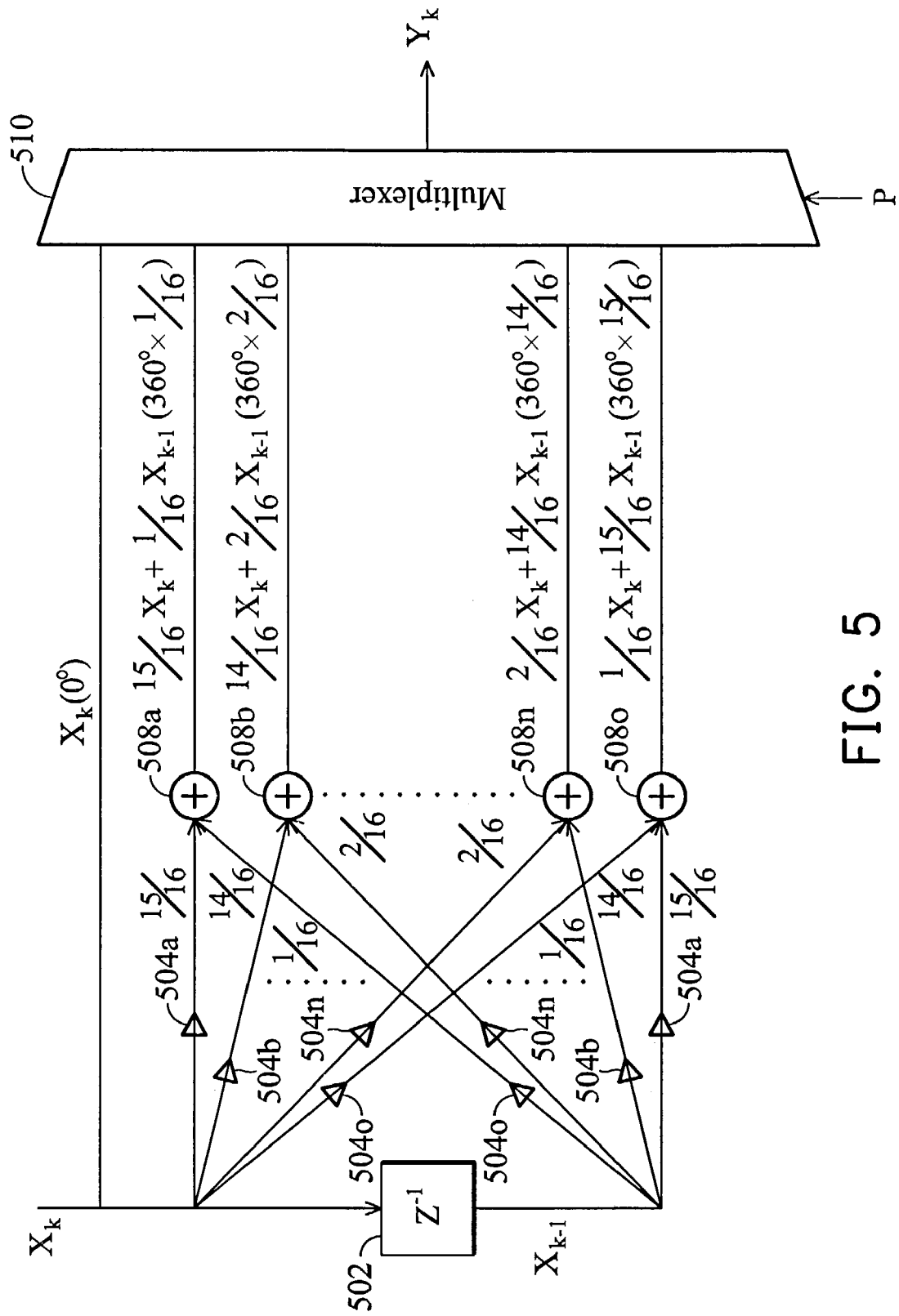
FIG. 5 is a schematic diagram illustrating an example of the phase interpolator according to the embodiment of the invention.

FIG. 5 is a schematic diagram illustrating an example of the phase interpolator according to the embodiment of the invention. The same-channel phase interpolator 412 is used as an example to illustrated the configuration shown in FIG. 5. Thus, the configuration shown in FIG. 5 can use in the near-channel phase interpolator 432. As shown in FIG. 5, the phase interpolator comprises a Z transform of a one period delay ($Z^{-1}$) 502, multipliers 504a~504o, adders 506a~506o and a multiplier 510. The constants of the multipliers 504a~504o are respectively 1/16~15/16. A signal $X_k$ is the signal transmitted from the transmitting end Tx1 at the time point k. A signal $X_{k-1}$ is the signal transmitted from the transmitting end Tx1 at the time point k−1.

After the same-channel phase interpolator 412 receives the signal $X_k$ at the time point k, the same-channel phase interpolator 412 mixes the signal $X_k$ and the signal $X_{k-1}$ to produce 2n signals with different phases and inputs the signals to the multiplier 510. In this embodiment, $2^4(16)$ is used as example. The different phases are respectively 0, (2Π×1/16), (2Π×2/16), (2Π×3/16), . . . , (2Π×15/16) and 2Π and the respective signals are $X_k$, $15/16X_k+1/16X_{k-1}$, $14/16X_k+2/16X_{k-1}$, $13/16X_k+3/16X_{k-1}$, . . . , $2/16X_k+14/16X_{k-1}$ and $1/16X_k+15/16X_{k-1}$. after the phase choosing signal P produced by the timing recovery circuit 410 is input to the multiplier 510, the multiplier 510 determines a specific phase from the above different phases and produces the same-channel phase-modified signal $Y_k$ with the specific phase produced by the same-channel phase interpolator 412 to output.

Figure 6:
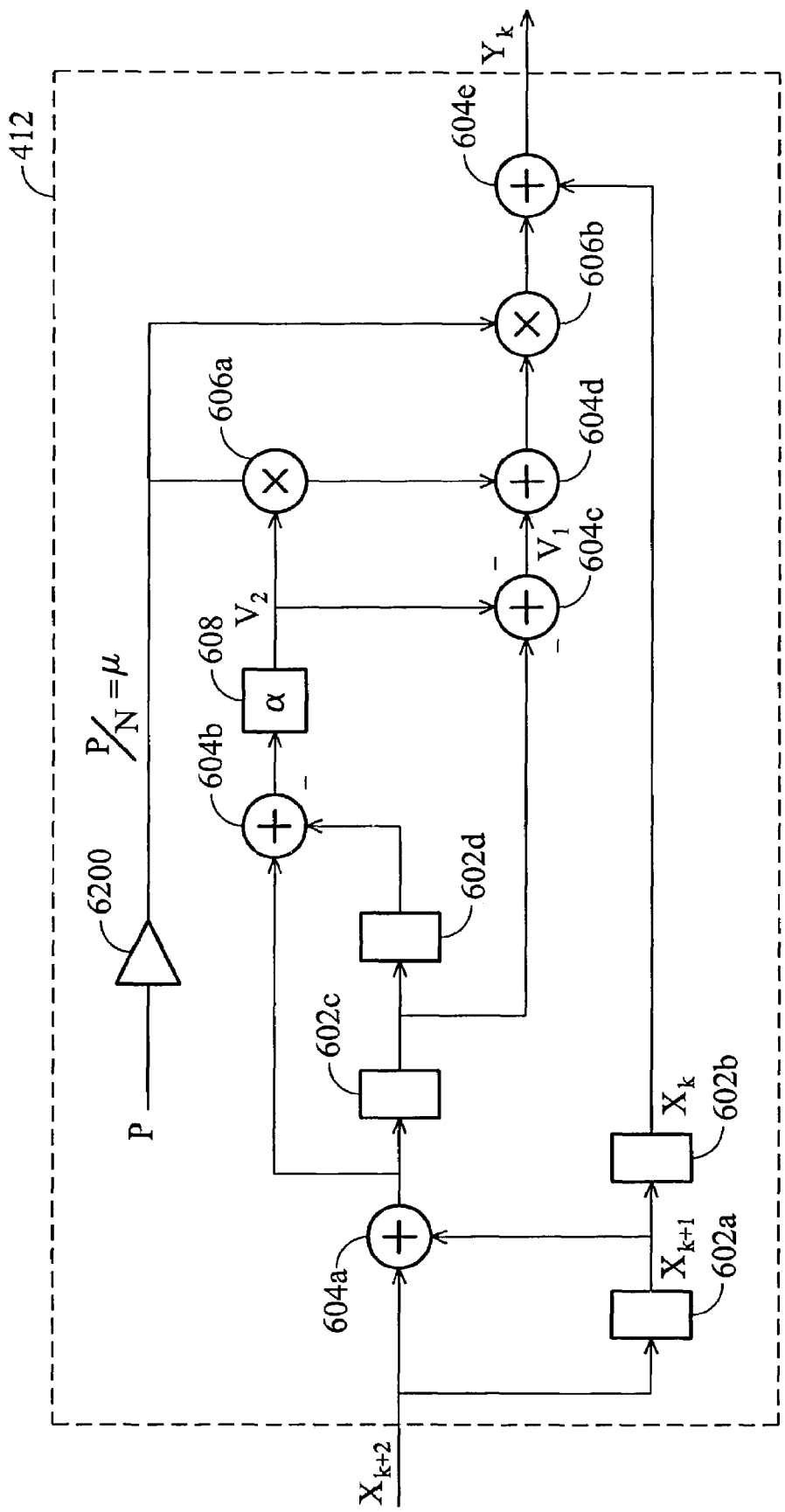
FIG. 6 is a schematic diagram illustrating another example of the phase interpolator according to the embodiment of the invention.

FIG. 6 is a schematic diagram illustrating another example of the phase interpolator according to the embodiment of the invention. "Architecture and VLSI Implementation of Digital Symbol Timing Recovery for DTV Receiver", Herb Huang, IEEE Transactions on Consumer Electronics, Vol. 45, No. 2, May 1999, herein incorporated by reference, discloses the configuration of the phase interpolator. The same-channel phase interpolator 412 is used as an example to illustrate the configuration shown in FIG. 6. Thus, the configuration shown in FIG. 6 can be used in the near-channel phase interpolator 432.

As shown in FIG. 6, the same-channel phase interpolator 412 comprises delay units 602a~602d, adders 604a~604d, multipliers 606a~606d and a device for determining parameters 608. Signals $X_{k-1}$, $X_k$, $X_{k+1}$ and $X_{k+2}$ are the signals transmitted from the transmitting end Tx1 respectively at the time point k−1, k, k+1 and k+2. The same-channel phase interpolator 412 implements a transfer function equal to $Y_k=X_k+\mu V_1+\mu^2 V_2$, where $V_1=-\alpha X_{(k+2)}+(\alpha+1) X_{(k+1)}+(\alpha-1) X_{(k)}-\alpha X_{(k-1)}$ and $V_2=\alpha X_{(k+2)}-\alpha X_{(k+1)}-\alpha X_{(k)}+\alpha X_{(k-1)}$, wherein $Y_k$ is the same-channel phase-modified signal, µ is the phase choosing signal P divided by a total number of the different phases N and α is a parameter determined by the device for determining parameters 608. The value of µ is between 0 and 1. When the parameter α is equal to 0.25, the hardware design of the same-channel phase interpolator 412 easily provides good interpolated results. To obtain µ, before the phase choosing signal P is input to the same-channel phase interpolator 412, the phase choosing signal P is input to the divider 620 to divide a total number of the different phases N.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Thus, the scope of the appended claims should be accorded the broadest interpretation so as to encompass all such modifications and similar arrangements.

What is claimed is:

1. A transceiver for echo and near-end crosstalk cancellation in a digital data transmission system where the transceiver communicates over a communications channel, the transceiver comprising:

a receiver for receiving a signal transmitted from the communication channel;

a timing recovery circuit for generating a phase choosing signal according to the received signal;

a same-channel phase interpolator for receiving a same-channel signal which will be transmitted from a same-channel transmitting end to the communication channel to generate a plurality of signals with a plurality of different phases, and the phase choosing signal to determine a specific phase from the different phases, the same-channel phase interpolator determining a same-channel phase-modified signal with the specific phase and outputting the same-channel phase-modified signal;

an echo canceller for receiving the same-channel phase-modified signal to cancel an echo in the received signal;

a near-channel phase interpolator for receiving a near-channel signal which will be transmitted from a near-channel transmitting end to the communication channel to generate a plurality of signals with a plurality of different phases, and the phase choosing signal to determine a specific phase from the different phases, the same-channel phase interpolator determining a near-channel phase-modified signal with the specific phase and outputting the near-channel phase-modified signal; and a near-end crosstalk canceller for receiving the near-channel phase-modified signal to cancel a near-end crosstalk signal in the received signal.

2. The transceiver as claimed in claim 1, further comprising:

a multi-phase clock circuit for generating a plurality of clock signals with different phases; and a multiplexer for receiving the clock signals and the phase choosing signal, the multiplexer choosing one of the clock signals by the phase choosing signal to generate a new clock signal to feed to the receiver.

3. The transceiver as claimed in claim 1, wherein the same-channel phase interpolator comprises:

a multiplexer for receiving the signals with different phases and the phase choosing signal, the multiplexer choosing one of the signals by the phase choosing signal to generate the same-channel phase-modified signal to feed to the echo canceller.

4. The transceiver as claimed in claim 1, wherein the same-channel phase-interpolator implements a transfer function equal to $y_k = x_k + \mu v_1 + \mu^2 v_2$, where $v_1 = -\alpha x_{(k+2)} + (\alpha+1)x_{(k+1)} + (\alpha-1)x_{(k)} - \alpha x_{(k-1)}$ and $v_2 = \alpha x_{(k+2)} - \alpha x_{(k+1)} - \alpha x_{(k)} + \alpha x_{(k-1)}$, wherein $y_k$ is the same-channel phase-modified signal, $x_k$ is the same-channel signal, k is a time constant, $\mu$ is the phase choosing signal divided by a total number of the different phases and $\alpha$ is a parameter determined by the transceiver.

5. The transceiver as claimed in claim 1, wherein the near-channel phase interpolator comprises:

a multiplexer for receiving the signals with different phases and the phase choosing signal, the multiplexer choosing one of the signals by the phase choosing signal to generate the near-channel phase-modified signal to feed to the echo canceller.

6. The transceiver as claimed in claim 1, wherein the near-channel phase-interpolator implements a transfer function equal to $y_k = x_k + \mu v_1 + \mu^2 v_2$, where $v_1 = -\alpha x_{(k+2)} + (\alpha+1)x_{(k+1)} + (\alpha-1)x_{(k)} - \alpha x_{(k-1)}$ and $v_2 = \alpha x_{(k+2)} - \alpha x_{(k+1)} - \alpha x_{(k)} + \alpha x_{(k-1)}$, wherein $y_k$ is the near-channel phase-modified signal, $x_k$ is the near-channel signal, k is a time constant, $\mu$ is the phase choosing signal divided by a total number of the different phases and $\alpha$ is a parameter determined by the transceiver.

7. In a digital data transmission system where a transceiver transmits a same-channel signal from a same-channel transmitting end to a communication channel and a near-channel signal from a near-channel transmitting end to the communication channel, and receives a signal from the communications channel, a method of the transceiver for echo and near-end crosstalk cancellation comprising the steps of:

determining a phase choosing signal according to the signal received by a receiver;

generating a same-channel phase-modified signal and a near-channel phase-modified signal with a specific phase determined by the phase choosing signal; and canceling an echo in the received signal by feeding the same-channel phase-modified signal to an echo canceller and a near-end crosstalk signal in the received signal by feeding the near-channel phase-modified signal to a near-end crosstalk canceller.

8. The method as claimed in claim 7, further comprising the steps of:

generating a timing signal with the specific phase to input to the receiver.

9. The method as claimed in claim 7, wherein the generating steps further comprises:

receiving the same-channel signal to generate a plurality of signals with a plurality of different phases;

determining the specific phase according to the phase choosing signal; and choosing one of the signals by the phase choosing signal to generate the same-channel phase-modified signal with the chosen phase.

10. The method as claimed in claim 9, wherein receiving the same-channel signal further comprises using a phase interpolator to expand the same-channel signal to generate the signals with the different phases.

11. The method as claimed in claim 9, wherein the generating step implements a transfer function equal to $y_k = x_k + \mu v_1 + \mu^2 v_2$, where $v_1 = -\alpha x_{(k+2)} + (\alpha+1)x_{(k+1)} + (\alpha-1)x_{(k)} - \alpha x_{(k-1)}$ and $v_2 = \alpha x_{(k+2)} - \alpha x_{(k+1)} - \alpha x_{(k)} + \alpha x_{(k-1)}$, wherein $y_k$ is the same-channel phase-modified signal, $x_k$ is the same-channel signal, k is a time constant, $\mu$ is the phase choosing signal divided by a total number of the different phases and $\alpha$ is a parameter determined by the transceiver.

12. The method as claimed in claim 7, wherein the generating steps further comprise:

receiving the near-channel signal to generate a plurality of signals with a plurality of different phases;

determining the specific phase according to the phase choosing signal; and choosing one of the signals by the phase choosing signal to generate the near-channel phase-modified signal with the chosen phase.

13. The method as claimed in claim 12, wherein receiving the same-channel signal further comprises the step of using a phase interpolator to expand the near-channel signal to generate the signals with the different phases.

14. The method as claimed in claim 12, wherein the generating steps implement a transfer function equal to $y_k = x_k + \mu v_1 + \mu^2 v_2$, where $v_1 = -\alpha x_{(k+2)} + (\alpha+1)x_{(k+1)} + (\alpha-1)x_{(k)} - \alpha x_{(k-1)}$ and $v_2 = \alpha x_{(k+2)} - \alpha x_{(k+1)} - \alpha x_{(k)} + \alpha x_{(k-1)}$, wherein $y_k$ is the near-channel phase-modified signal, $x_k$ is the near-channel signal, k is a time constant, $\mu$ is the phase choosing signal divided by a total number of the different phases and $\alpha$ is a parameter determined by the transceiver.

* * * * *